UNITED STATES PATENT OFFICE.

N. C. LINCOLN, OF BRUNSWICK, MAINE.

IMPROVED MEDICINE.

Specification forming part of Letters Patent No. 58,652, dated October 9, 1866.

*To all whom it may concern:*

Be it known that I, N. C. LINCOLN, of Brunswick, in the State of Maine, have invented and discovered a new and useful Catarrh Medicine; and I hereby declare the following to be a full, clear, and exact description thereof, which will enable others to make and use my invention, to wit:

My invention is composed of four different ingredients, viz: powdered laurel, pulverized sugar, spirits camphor, and essence of checkerberry. Instead of the camphor dissolved in alcohol, pulverized camphor may be employed, reduced to a fine powder; but I prefer to use it in a liquid state. White sugar is preferable to any other, though brown or light-colored sugar may be, in the absence of white, employed.

I mix my medicine in the following proportions, viz: four ounces of powdered laurel, one ounce of pulverized sugar, one-half ounce of spirits of camphor, and one-half ounce of essence of checkerberry.

Preserving the above proportions the medicine can be mixed in any desired quantity, placed in bottles or jars and tightly corked, and so preserved.

By keeping the bottle or jar carefully closed the preparation is kept sufficiently moist to be conveniently taken.

My medicine is used as a snuff for the nose, and can be employed as the severity of each particular case requires. No more specific directions for its use are necessary.

What I claim as my invention, and desire to secure by Letters Patent, is—

The compound of ingredients for a catarrh medicine, mixed in the manner and proportions above described.

N. C. LINCOLN.

Witnesses:
WILLIAM H. CLIFFORD,
HENRY C. HOUSTON.